July 2, 1963  E. WAINER ETAL  3,096,144
METHOD OF MAKING INORGANIC FIBERS
Filed Aug. 12, 1960

FIG. 1.

```
Form Mixture Of
Metal Salt Of Strong Acid
And
Alkali Salt Of Weak Acid
          │
Adjust pH To Between 5 & 9
          │
Spread As Thin Layer On Solid Support
          │
Heat To Remove Water And
Transform Layer To Gel Form
          │
Continue Heating And Drying At About 150°C.
Until All Free Water Has Been Removed
          │
Slowly Raise Temperature To 600-800°C.
Maintain At Temperature In Oxidizing Atmosphere
10-20 Minutes
          │
Cool To Room Temperature
          │
Wash To Remove Any Residual Water
Soluble Material
          │
Dry Resulting Porous Fibrous Product
          │
Impregnate With Oxide Forming Metal Salt
          │
Fire In Oxidizing Atmosphere Above 600°C.
```

FIG. 2.

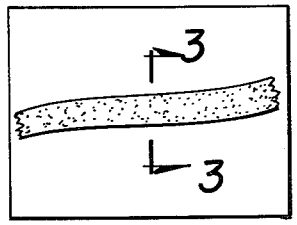

Microporous Oxide Fiber
Length 2.5 mm.- 6 Inches
Width 5-25 Microns
Thickness 0.2-1.5 Microns

FIG. 3.

FIG. 4.

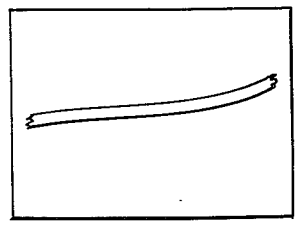

Fired Fibers
L:W > 100:1  L:T > 1000:1

INVENTORS
Eugene Wainer
Edward F. Mayer
BY  Lawrence J. Field
ATTORNEY

United States Patent Office 3,096,144
Patented July 2, 1963

3,096,144
METHOD OF MAKING INORGANIC FIBERS
Eugene Wainer, Cleveland, and Edward F. Mayer, Novelty, Ohio, assignors to Horizons Incorporated, Cleveland, Ohio, a corporation of New Jersey
Filed Aug. 12, 1960, Ser. No. 49,158
6 Claims. (Cl. 18—54)

This invention relates to fibers of inorganic oxide materials and to methods of producing said fibers. More particularly, it relates to fibers having porosities as high as up to 75% and consisting of single inorganic oxides or combinations of two or more inorganic oxides either as mixtures or as compounds or in other complex association with one another. In addition, the invention relates to novel methods of forming such fibers.

Briefly the fibers of the present invention are formed by (1) preparing a fiber-forming composition in the form of a colloidal dispersion of suitable inorganic materials, using as starting materials water soluble salts from which sols which are relatively stable in the presence of relatively large quantities of ionized salts are produced; (2) forming crude fibers by a succession of heat treatments wherein a thin film of the fiber-forming composition is caused to pass through an incipient gel stage and, as additional amounts of water are eliminated, is converted to crude fibers; (3) treatment of the crude fibers to remove substantial amounts of water soluble constituents originally present in the crude fiber, leaving a porous fiber as one product, susceptible of use in the porous form and finally (4) firing the porous fiber at considerably higher temperatures to shrink the porous fiber to produce another product useful in other ways than the unfired product.

In various copending applications including Serial No. 777,193 filed December 1, 1958; Serial No. 829,220, filed July 24, 1959, and now Patent No. 3,082,051; Serial No. 852,178, filed December 1, 1959, and now Patent No. 3,082,013; and Serial No. 11,121, filed February 26, 1960, and now Patent No. 3,082,099, assigned to the same assignee as the present application, methods and products have been described in the field of fiber production technology which comprise making available a fairly concentrated colloidal dispersion in the form of a relatively pure sol, dispersed usually in water, spreading such a colloidal dispersion or sol in water media in a thin film, heating such thin film to a temperature at which the material will gel and dry partially on a surface such that a fibrous structure is obtained (said drying step comprising the formation of a stable gel from said sol), removing the gelled material in fibrous form from the surface, drying further at a temperature of the order of 125 to 150° C. to remove as much water as possible at this step, and finally firing for consolidation of the fiber so as to yield the maximum of mechanical and other desired properties.

In order to accomplish these results, fairly complicated techniques to yield the desired starting material are required. In the case of materials available in hydrated form, stable sols and methods for producing same have been described in one or more of the aforesaid specifications in systems in which fairly high concentrations were available by reducing the amount of contaminants, particularly of inorganic nature, such as might be used for peptizing purposes and the like, to extremely small amounts. Also described were variations of such a technique, involving the use of organic salts of metals which yield a sol stage on heating solutions and, subsequently if the temperature of heating is further increased, a gel stage suitable for the formation of fibers. In both such cases, relatively pure starting materials are utilized. Hence contaminants which might remain with the fiber throughout the firing step were either eliminated in the chemistry of the starting material or were the kind of contaminants, e.g. organic compounds, which could be burned out as a result of the firing step. It was considered that the presence of the inorganic by-products which might be present as the result of other methods of preparation of the sol (e.g. preparation of the sol by a common double decomposition reaction) would disrupt the fiber structure so completely if these contaminants were retained through the firing step that a non-usable product would be made. Experimentation has indicated that this is the case, and as a consequence, prior to the present invention it was concluded that useful fibers could only be obtained through the use of sols prepared so as to be free of inorganic contaminants.

This represented a restriction on the breadth of the types of materials which could be produced in that many materials which might be added in order to produce composite structured fibers from a chemical standpoint would act as precipitants for the already prepared stable sol. Attempts to produce ferroelectric barium titanate fibers, for example, or barium zirconate fibers failed when the attempt was made simply to mix the hydroxides of the alkaline earths with an already prepared stable sol of such oxide as titania, zirconia, and thoria, for example. The rate of precipitation of the sol as a result of adding the divalent hydroxide was so rapid that the gel form was obtained prior to placing the sol on the solid surface needed for the production of fibers, no matter how rapidly such mixing was taking place; and fibers are not readily produced from a pre-gelled state.

It is, therefore, one object of this invention to produce as fiber-forming compositions, stable sols prepared from inexpensive water soluble starting materials, said sols containing relatively large quantities of inorganic contaminants and such sols being capable of producing fibers under steps through which the inorganic contaminant can be removed, if desired, without destroying the desired structure of the fiber itself. It is a further object of this invention to produce chemically complex fibers comprising more than one oxide or more than one type of material. Barium titanate is an example of such a complexed oxide fiber. It is a further object of this invention to produce novel fibrous products substantially free of impurities to which additions can be made by impregnation so that, on subsequent treatment, the impregnant will become an integral part of the fiber on a chemical basis without destroying fibrous structure. It is a further object of this invention to produce a novel fiber in highly porous form which may be used directly in such form or as a base for impregnation with other materials, or which can be refired in its porous or impregnated state to produce particularly useful fibrous products.

In carrying out the techniques and in preparing the products of this invention, it has been found that procedures involving double decomposition reactions are particularly useful. In general, a preferred procedure comprises the formation of a sol through the mixing of a water solution of a salt of a strong acid with an alkali salt of a weak acid with or without the further addition of either strong mineral acids or weak acids such as organic acid and with or without the addition of agents such as protective colloids, alcohols, sugars, water soluble gums, and the like. The weak acid salt of the alkali is generally utilized to adjust the pH to a specific range short of either gel formation or flocculant precipitation. The sol in this form, which may be highly concentrated, is then spread in a thin film on a suitable surface so as to permit free evaporation and heated to above the gel point at which stage fibers, which still have a water sensitive characteristic, are produced. Such fibers are removed from the surface and are then dried at temperatures of the order of 150° C. until all water possible to remove at these temperatures has been removed, after which the fiber is then fired preferably in a furnace and in an oxidizing atmosphere by slowly raising the temperature from 150° C. to approximately 600° C. and sometimes as high as 800° C., and maintained at this temperature until the entire mass has fully reached the temperature. After this stage of heat treatment, the fibers are removed from the furnace and washed thoroughly with deionized water to remove all water soluble inorganic contaminants.

We have found that, after the above described heating to at least 600° C. and sometimes as high as 800° C., the fibers may be leached with water for removal of the water-soluble constituents without destroying the essentially fibrous structure of the product initially formed by drying the thin film of fibering composition. Other solvents in place of water can be used depending on the chemical nature of the undesired ingredient, such solvents being alcohols and ketones. After the washing is complete, the fibers are again dried at 150° C. and it is found that the product, though exhibiting the fibrous stage, is exceptionally porous. The porous form of the fiber may be used directly without further treatment. For example, porous fibers composed of simple oxides or mixed oxides are highly effective catalysts.

Porosity to the extent of at least 50% is possible in most cases, and in some cases this may extend as high as 75% by volume. The pores are submicroscopic in size and manifest themselves on visual examination as an opalescence, and these pores are generally not resolved under the microscope, indicating that the pores approach molecular size and that they are in the range of 5 to 20 millimicrons in diameter.

Alternatively, the porous form may be impregnated with organic salts of a variety of metals and then refired to a suitable final consolidation temperature in order to produce a composition difficult to obtain otherwise. For example, this is one of the means for producing a ferroelectric fiber, in which the original porous fiber is comprised of either titania, zirconia, thoria, and similar oxides and the porous fiber is impregnated with acetates or similar water soluble organic salts of the alkaline earths, in amounts sufficient to produce a particular composition for a ferroelectric or piezoelectric purpose, and the product then refired so as not only to retain the fibrous form but to produce a dense fiber of chemical composition different than the original porous fiber which had been originally achieved at the 600° C. firing level. Furthermore, instead of utilizing the porous product directly, the porosity may be substantially diminished and even entirely eliminated by refiring the porous and the now pure product to a temperature in the range 900° C. to 1500° C., depending on the refractory characteristic of the particular compound of which the fiber is composed.

All of the methods for preparing useful sols for the purposes of our invention generally involve the adjustment of the pH of a strong acid salt of a particular compound either with alkali or with an alkali salt of a weak acid with or without the presence of a protective agent. With salts of zirconium, titanium, iron, aluminum, chromium, uranium, and similar metals, the usual technique is to add sodium or potassium, carbonate or acetate to a solution of the nitrate or chloride of the metal either until a suitable pH is reached or until a stage is reached at which the pH may be adjusted with either acetic acid or ammonium hydroxide to yield the conditions for achieving the best type of sol.

Minor variations of this procedure are utilized for other metals. In the case of copper, for example, copper acetate may be treated with less than the equivalent amount of ammonia to produce complete precipitation, and then sulfate ion in minor quantities in the form of potassium sulfate is added for stabilization purposes. In the case of sodium silicate, an excess of a strong acid may be added to sodium silicate quickly in order to produce a temporarily stable sol of silica. Cobalt compounds in the cobaltous condition will produce sols by techniques similar to those described for copper. In the case of tin, generally alkali such as ammonium hydroxide or sodium hydroxide is added to water solutions of tin tetrachloride to a stage just short of precipitation of the tin. A converse technique suitable for tin is to add acids such as hydrochloric or acetic to water solutions of sodium stannate to just short of precipitation. Thorium sols are produced by the mixing of the chloride or the nitrate of thorium with alkali such as ammonium or sodium hydroxide in the presence of a minor amount of glycerol or sugar. Manganese hydrous oxide sols are produced by the reduction of potassium permanganate with hydrogen peroxide in the presence of glucose and alkali.

Mixed sols may be produced by a variety of techniques. For example, zirconium oxychloride solutions mixed with freshly precipitated aluminum hydrate will yield a sol of zirconium hydrate with aluminum chloride in solution. On subsequent fiber formation and firing, a mixed zirconia-alumina fiber is produced. Generally, a significant amount of sodium acetate and glycerol is required for pH adjustment and stabilization. Barium titanate and similar starting materials may also be produced in solid form by a variety of procedures. In the first case, equimolecular mixtures of titanium tetrachloride and barium nitrate in water solution are mixed. Glycerol or sucrose is added and the pH adjusted with sodium acetate. Generally, such sols are not stable except in the presence of a complexing agent such as glycerol or sucrose. Another means for producing the compound is to dissolve barium titanate in a mixture of nitric and hydrochloric acids, and again subsequently adjust the pH with sodium acetate in the presence of a protective colloid or a sugar. The titanates of strontium and calcium may be prepared similarly. The zirconates of the alkaline earths may be produced either through use of mixtures of the chlorides of zirconium and the nitrates of the alkaline earths or the nitrate of zirconia may be substituted for the chlorides. Again adjustment of pH is carried out through use of sodium acetate in the presence of glycerol, sugar, or a protective colloid such as gelatin.

The majority of the sols produced by the varied techniques indicated in the foregoing are generally quite stable at room temperature for long periods of time. In some cases, however, gelling will be initiated within one to two hours after the preparation, and for this reason, it is preferred that the sol be utilized for subsequent fiber formation steps immediately after preparation. In addition, if such sols are heated to temperatures below the boiling point of water, usually they will begin to gel generally in the range of 60 to 90° C., and if heated above this temperature under such conditions that little or no water is lost, the gel will reliquefy. Under such conditions, a sol is again formed but generally less stable than previously.

While we do not wish to be bound by any specific theory, it appears that if the sol which goes through this gel and reliquefaction stage as a function of raising the temperature is heated in such a way that the gelling takes place simultaneously with the evaporation of water, the reliquefaction stage is not reached, and the tendency for the gel to reverse to the sol condition is removed the higher the temperature at which the simultaneous gelling and evaporation takes place. After the desired form has been reached, if residual water is continued to be evaporated, then substantially all tendency for reliquefaction has been removed.

In summary of the foregoing in the practice of the present invention, relatively stable, highly concentrated sols are formed by double decomposition reactions through the medium of preparation of a colloidal dispersion by adjustment of the pH of a water soluble salt of a strong acid of the respective metal compound with alkali salt of a weak acid, spread in a thin layer on a smooth chemically resistant surface such as glass, subjected to temperatures such that the sol will transform quickly to a gel and at a temperature high enough so that rapid evaporation of water takes place simultaneously with such gel precipitation so as to prevent reliquefaction of the precipitate material, continuing the heating until fibers formed as the result of such continued drying of the gel, removing the fibers from the surface and completing the drying at a temperature of the order of 150° C. until all free water has been removed and then slowly raising the temperature to at least 600° C. for a time sufficient so that the thermal treatment of the batch at this temperature is complete, cooling to room temperature, and washing preferably with deionized water to remove all residual water soluble salts, and drying. At this stage, the fibers produced may be used directly primarily in the field of catalysis, or they may be consolidated completely to close the pores by heating to temperatures of the order of 900 to 1500° C., depending on the character of the oxides making up the fibers, or the porous fiber may be impregnated with concentrated solutions of other salts so as to further change the chemical composition of the fiber in question, followed by firing for consolidation.

In the description above, the preferred procedure specifies thermal treatment at about 600° C. It is to be understood that the firing temperatures and the duration of the firing step may be varied considerably depending on the specific materials being treated, firing being carried out to convert the fiber composition to the oxides indicated and to remove all organic constituents. Firing in an oxidizing atmosphere for between 10 minutes and 2 hours at temperatures from about 600° C. to 800° C. is satisfactory.

In the drawings:

FIGURE 1 is in the nature of a flowsheet outlining a preferred manner of practicing the present invention;

FIGURE 2 is a schematic view of the fiber product at one stage of the process;

FIGURE 3 is a view taken along plane 3—3 of FIGURE 2 showing the rectangular cross section of the fiber; and FIGURE 4 is a view similar to that in FIGURE 2 showing the fiber product after additional treatment.

The following examples are intended to be illustrative of our method of practice and are not to be construed as limitative, since it will be understood that the procedure is applicable to many additional substances.

*Example 1*

Three hundred eight-five grams of the octahydrate of zirconium oxychloride were dissolved in one liter of water. After solution is complete, the insoluble impurities were removed by allowing the solution to stand until any solid particles had settled out, after which the solution was decanted through a filter. Seventy-five grams of anhydrous sodium carbonate was added in powdered form to the solution slowly and with stirring. The stirring was continued until all precipitate which formed initially, completely redissolved. Twenty grams of anhydrous sodium carbonate were dissolved in 1400 cc. of water; and after solution was complete, this reagent was added to the partially alkalized zirconia solution with vigorous stirring, taking about 5 minutes to complete the addition. The vigorous stirring was continued for about 5 minutes longer. The pH of the solution at this point was 2.75. No visible precipitate could be seen in the solution which appeared clear by transmitted light and very slightly opalescent by reflected light.

The solution was then spread on a Pyrex glass plate at a thickness of the order of 10 microns. The glass plate was moved past a bank of infrared heaters at a rate such that the drying edge was maintained at a temperature of the order of 90° C. Under these conditions, the thin solution dried rapidly, passed into a gel stage, and the initial fibrous form was obtained. After the plate had been moved past the heaters, the resulting fibrous form was removed from the glass plate, e.g. by scraping with a razor blade and was then immediately placed in an oven, maintained at a temperature of 150° C. and retained in such oven for one hour. The temperature was then raised at the rate of about 200° C. per hour to 600° C. and held at this level for one hour longer. The fibers were then removed from the oven and allowed to cool to room temperature.

After cooling, the fibers were washed by percolation with deionized water until the wash waters no longer exhibited a test for chloride ion and the washing was then continued at the original rate for 10 minutes longer. The residual water was removed by decantation and the batch was again placed in the oven at 150° C. until the fibers were completely dry. At this stage, the fibers were opalescent to opaque and had a good degree of flexibility. The raw fibers were then placed in a furnace, and the temperature raised to 1400° C. in two hours and retained at this temperature for one hour longer. After such firing, the fibers were found to have shrunk in size to approximately half the original length and thickness, and were clear and transparent.

Approximately 150 grams of product were obtained from the batch described in the foregoing. The fibers exhibited a monoclinic structure.

*Example 2*

The procedure of Example 1 was repeated using 385 grams of zirconium oxychloride octahydrate dissolved in a liter of water and purified as described above. Two hundred and forty grams of sodium acetate trihydrate and 15 grams of hydrated calcium acetate were dissolved in 1200 cc. of deionized water. After clarification of both solutions, the sodium calcium acetate solution was added rapidly with stirring to the zirconium oxychloride solution, taking between 5 and 6 minutes to complete such addition and the stirring was continued for 5 minutes thereafter. Again, a slightly opalescent solution substantially free of precipitate was obtained exhibiting a pH of 3.1. Thereafter the slightly opalescent colloidal dispersion was treated in exactly the same manner as described in Example 1, and again a yield of approximately 150 grams of fibrous product was obtained.

The fibers showed an essentially cubic structure after final heat consolidation.

*Example 3*

One hundred forty-two grams of finely divided sodium meta-titanate of formula $Na_2TiO_3$ were added rapidly with stirring to 390 cc. of 32% hydrochloric acid. A vigorous reaction took place almost immediately with evolution of substantial heat. As the reaction approached peak intensity, the solution cleared momentarily after which a white granular precipitate started to form. As soon as the formation of this white granular precipitate was well advanced, 500 cc. of cold water were added rapidly with stirring. In a separate container, 240 grams of sodium acetate trihydrate and 3 grams of tartaric acid were dissolved in 800 cc. of water, and after solution was complete, this reagent was added rapidly with stirring to the titania containing solution, taking about 5 minutes to complete the addition and the vigorous stirring was then continued for another 5 minutes.

The slightly opalescent colloidal solution was again treated as described in Example 1 involving the spreading of the liquid on a glass plate, heating at 90° C. to produce the gel fiber form, drying followed by heat treatment at 600° C., washing to remove soluble salts, and finally consolidating to final form by firing at 1200° C. in an oxidizing atmosphere. Approximately 80 grams of fibrous titania were obtained.

Example 4

One hundred ninety grams of titanium tetrachloride liquid were added slowly and with stirring to 300 cc. of cold water. A clear solution resulted which was allowed to cool to room temperature. One hundred six grams of anhydrous sodium carbonate, 250 grams of sodium acetate trihydrate, and 3 grams of tartaric acid were dissolved in 1600 cc. of water. After clarification, this solution was added rapidly and with stirring to the cold titanium chloride solution, taking about 5 to 6 minutes to complete the addition of the alkaline reagent, after which stirring was continued for about 5 minutes longer. The colloidal dispersion thus obtained was immediately transformed into fibers in accordance with the technique described in Example 1 except that the final consolidation temperature was 1200° C. Approximately 80 grams of titanium oxide fiber were obtained.

Example 5

Four hundred eighty-three grams of aluminum trichloride hexahydrate were dissolved in 1500 cc. of water. Concentrated ammonia water was added slowly with vigorous stirring until a pH of approximately 6.5 was reached and stirring was continued with adjustment by dropwise addition of $NH_4OH$ until the pH of 6.5 represented a stable value. The precipitated aluminum hydrate slurry was filtered and washed as free of chloride as possible with deionized water. The filter cake is removed from the filter and dispersed by vigorous stirring in 1500 cc. of deionized water. After stirring was complete, 10 grams of glycerol were added. In a separate container, 970 grams of zirconium oxychloride octahydrate were dissolved in 2 liters of water and the solution clarified. The zirconium oxychloride solution was added rapidly and with stirring to the suspension of aluminum hydrate containing glycerol. Fifty grams of sodium acetate dissolved in 200 cc. of water were finally added with stirring over a three minute period and the stirring continued for another 5 minutes. A deeply opalescent solution containing no visible flocculant precipitate was obtained. This was treated in accordance with Example 1 except that the final washed product after the heat treatment step at 600° C. was calcined at 1300° C. for final consolidation. Approximately 470 grams of fibers were obtained.

Example 6

Three hundred twenty-four grams of hydrated ferric chloride were dissolved in 1 liter of water and the solution clarified. In another beaker, 280 grams of anhydrous potassium acetate were dissolved in 1 liter of water. After solution was complete, 5 grams of sucrose were added to the sodium acetate solution. The sodium acetate solution was added rapidly and with stirring over a space of about 5 minutes to the ferric chloride solution and again the stirring was continued for 5 minutes. Thereafter, the product was deposited in the form of fibers, dried, washed, and reconsolidated by heat treatment at 950° C. to yield a deep red transparent fiber. Eighty-seven grams of product were obtained.

Example 7

Two hundred ninety grams of aluminum trichloride hexahydrate were dissolved in 800 cc. of water. In another beaker, 388 grams of sodium acetate trihydrate were dissolved in 1400 cc. of water. Both the solutions were clarified and the sodium acetate solution was added rapidly with stirring to the aluminum chloride solution over a space of 5 to 6 minutes, and again the stirring continued for 5 minutes further. After precipitation into the fibrous form, drying, prefiring, washing, and final consolidation at a temperature of 1200° C., approximately 60 grams of fibrous product were obtained.

Example 8

Three hundred thirty grams of chromium trichloride decahydrate were dissolved in a liter of water. In a second beaker, 130 grams of sodium hydroxide and 10 grams of cane sugar were also dissolved in a liter of water. The chromium chloride solution was added rapidly and with stirring to the caustic solution and stirred vigorously for ten minutes longer. A clear green solution was obtained showing some opalescence with reflected light. The solution was treated to produce a fibrous product as indicated in Example 1, and finally consolidated at 1400° C. Approximatedly 80 grams of product were obtained in fibrous form of a transparent deep green color.

Example 9

One hundred seventy-one grams of hydrated cupric chloride were dissolved in 1 liter of water. In a separate beaker, a solution was prepared by adding 130 cc. of 30% ammonia of specific gravity of 0.895 and 10 grams of cane sugar to 800 cc. of water. The ammoniacal solution was then added rapidly and with stirring to the cupric chloride solution and the stirring continued for 10 minutes longer. An opalescent green solution was obtained with no visible precipitate. The opalescent green solution was transformed into fiber by the procedure described in Example 1 except that the final firing consolidation temperature was 900° C. Approximately 80 grams of a black opaque fiber were produced.

Example 10

Six hundred twenty grams of uranyl nitrate (hexahydrate) were dissolved in 1200 cc. of water. One hundred thirty-one grams of anhydrous potassium carbonate and 5 cc. of glycerol were dissolved in 1 liter of water. The potassium carbonate solution, after clarification, was added rapidly with stirring to the uranium nitrate solution, and after stirring for a few minutes beyond the completion of the addition, a relatively clear solution exhibiting a greenish yellow opalescence was obtained. After firing and final consolidation at 1400 F. following the steps given in Example 1, 335 grams of fibrous product having a greenish black color were obtained.

Example 11

Three hundred eighty-five grams of zirconium oxychloride octahydrate were dissolved in 1 liter of water and the solution clarified. In another beaker, 270 grams of sodium acetate trihydrate, 315 grams of barium nitrate, and 20 grams of cane sugar were dissolved in 1500 cc. of hot water. After clarification, the solution was allowed to cool to room temperature and added rapidly with stirring to the zirconium oxychloride solution, a time of about 5 minutes being utilized for the addition. Stirring was continued for 5 minutes more. A somewhat cloudy solution showing no evidence of a flocculant precipitate was obtained. This was fibered as described in Example 1 except that the first heat treatment after drying was carried to 700° C. rather than 600° C., after which the fibers are washed free of water-soluble salts and recalcined at 1350° C. Three hundred thirty grams of fibrous product were obtained whose chemical analysis and X-ray structure indicated that the product was barium zirconate.

Example 12

One hundred forty-two grams of sodium metatitanate were dissolved in 390 cc. of 32% hydrochloric acid in accordance with the procedure indicated in Example 3, and after the reaction was completed, 500 cc. of water were added rapidly and the batch was allowed to cool to room temperature. In a separate beaker, 261 grams of barium nitrate, 240 grams of sodium acetate trihydrate, 20 grams of sugar, and 1 gram of gelatin were dissolved in 1500 cc. of warm water. After the solution had cooled to room temperature, it was added rapidly and with stirring to the titania containing solution and the solution fibered in accordance with the procedure given in Example 1, except that the initial firing after the drying stage was carried out at 700° C. After washing and redrying, the fibers were consolidated by firing at 1150° C. and approximately 230 grams of fibrous product were obtained. X-ray and chemical analysis indicated that the product was barium titanate.

*Example 13*

Washed porous fibrous product was prepared following the procedure of Example 3 and then saturated with a hot 7% solution of barium acetate. The fibers were sucked dry on a filter and then dried thoroughly at 150° C. prior to firing to 1150° C. Chemical analysis after firing at this temperature indicated that the barium oxide content was approximately 60% or roughly 6% less than that required for the stoichiometric ratio of 1 mole of barium oxide to 1 mole of titanium oxide in order to produce relatively pure barium titanate.

A second batch of fibers was prepared by impregnation with the hot barium acetate solution followed by drying at 150° C. and then firing at about 700° C., after which the batch was again impregnated with a 10% solution of barium acetate, dried as before, and fired to 1200° C. Under these conditions, the barium oxide content on analysis was 66% and the titanium oxide content approximately 34%, this being equivalent to the required proportions for barium titanate. X-ray analysis indicated that the ferroelectric material barium titanate had been produced in fibrous form.

*Example 14*

The fibrous product obtained in accordance with the procedure given in Example 12 is brought to the 700° C. stage in its preparation and washed. One hundred grams of the fibrous product were then treated with 100 cc. of a solution containing 2 grams of cobaltous acetate. After drying, the impregnated material was fired at 1200° C. A grayish black glistening fibrous product was obtained.

Fibers produced in accordance with the foregoing examples are useful in many ways. When in the form of individual flat filaments they serve as the base for capacitors and similar devices. A fired mass of fibers exhibiting directional properties may be used in the fabrication of ferroelectric devices.

Fibers having the following typical dimensions have been produced in accordance with the techniques described above Length from 2.5 millimeters to 6 inches
Width from 5 to 25 microns
Thickness from 0.2 to 1.5 microns
Ratio of length to width >100:1
Ratio of length to thickness >1000:1

In the description above "weak" acid is intended to designate acids having ionization constants, for the first hydrogen, below $1 \times 10^{-3}$ and "strong" acid to designate acids having ionization constants greater than $1 \times 10^{-2}$, for the first hydrogen.

The sols used, it will be noted are quite concentrated. With pH's ranging from about 5 to 9 and preferably between 6 and 8, the sols contain about 0.75–1.5 mols of oxide, or oxide source per liter of liquid vehicle.

Having described our invention in accordance with the patent statutes, we claim:

1. A method of forming filaments having a rectangular cross section and the following dimensions, length from 2.5 millimeters to 6 inches, width from 5 to 25 microns, thickness from 0.2 to 1.5 microns, ratio of length to width >100:1 and ratio of length of thickness >1000:1, said filaments being composed of inorganic oxide; which method comprises: forming a relatively stable highly concentrated sol, by bringing together in solution a metal salt of a strong acid and an alkali metal salt of a weak acid and thereafter adjusting the pH of the product resulting from the double decomposition reaction which occurs when the two said salts are brought together to produce a composition with a pH between 5 and 9; spreading the resulting filament forming composition as a thin layer on a chemically resistant solid surface; heating the thin layer to a temperature such that the sol of the layer is quickly transformed to a gel, simultaneously with the rapid evaporation of water; continuing the heating while filaments are formed as a result of the continued drying of the gel; completing the drying at about 150° C. until all free water has been removed; converting the dried fibrous material to metal oxide filaments by slowing raising the temperature of the dried material to between about 600° C. and 800° C. in an oxidizing atmosphere and maintaining the filaments within said temperature range for between 10 and 120 minutes; cooling the metal oxide filaments to room temperature; thereafter washing the filaments to remove all residual water soluble salts; drying the resulting porous inorganic oxide filaments; and then impregnating the porous product with a solution of an oxide forming metal salt.

2. The method of claim 1 wherein the product is an inorganic oxide fibrous material having a distinct color.

3. The method of claim 1 including in addition, to the steps recited, firing the impregnated product at temperatures above about 600° C. in an oxidizing atmosphere.

4. The method of claim 3 wherein the oxide of the porous product and the oxide formed by exposing the impregnant salt to an oxidizing atmosphere at temperatures above 600° C. combine to form a ferroelectric material and the firing temperature and duration are sufficient to accomplish the combination of said oxides.

5. The method of producing the ferroelectric material of claim 4 wherein the fibers are composed of material selected from the group consisting of titanates, zirconates, niobates, tantalates, and stannates and mixtures of said materials, characterized by a perovskite crystal habit.

6. The method of claim 4 wherein the ferroelectric produced is barium titanate.

References Cited in the file of this patent

UNITED STATES PATENTS

| | | |
|---|---|---|
| 2,612,679 | Ladisch | Oct. 7, 1952 |
| 2,674,025 | Ladisch | Apr. 6, 1954 |
| 2,886,404 | Teja | May 12, 1959 |
| 2,908,545 | Teja | Oct. 13, 1959 |
| 2,915,475 | Bugosh | Dec. 1, 1959 |